(12) United States Patent
Yebka et al.

(10) Patent No.: US 8,895,168 B2
(45) Date of Patent: Nov. 25, 2014

(54) DEACTIVATING A POWER SOURCE

(75) Inventors: Bouziane Yebka, Apex, NC (US);
Joseph Anthony Holung, Wake Forest, NC (US); Tin-Lup Wong, Chapel Hill, NC (US); Kenneth Scott Seethaler, Wake Forest, NC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 727 days.

(21) Appl. No.: 12/715,606

(22) Filed: Mar. 2, 2010

(65) Prior Publication Data

US 2011/0214928 A1  Sep. 8, 2011

(51) Int. Cl.
| | |
|---|---|
| *B60K 1/04* | (2006.01) |
| *H01M 2/00* | (2006.01) |
| *H01M 10/50* | (2006.01) |
| *H01M 10/60* | (2014.01) |

(52) U.S. Cl.
CPC . *B60K 1/04* (2013.01); *H01M 2/00* (2013.01); *H01M 10/50* (2013.01)
USPC .......... 429/72; 429/61; 429/62; 429/50; 180/65.1; 29/623.1

(58) Field of Classification Search
CPC .............. H01M 2/34; H01M 2200/00
USPC .......... 429/50, 61, 62, 72; 180/65.1; 29/623.1
See application file for complete search history.

(56) References Cited

U.S. PATENT DOCUMENTS

| | | | | |
|---|---|---|---|---|
| 4,075,400 A | * | 2/1978 | Fritts | 429/62 |
| 6,074,776 A | * | 6/2000 | Mao et al. | 429/61 |
| 6,228,516 B1 | | 5/2001 | Denton et al. | 429/7 |
| 6,355,373 B1 | * | 3/2002 | Pauling | 429/75 |
| 7,939,190 B2 | * | 5/2011 | Colello et al. | 429/61 |
| 8,617,733 B2 | * | 12/2013 | Wahl et al. | 429/72 |
| 2006/0012334 A1 | * | 1/2006 | Watson | 320/112 |
| 2006/0286378 A1 | | 12/2006 | Chiruvolu et al. | 428/402 |
| 2007/0018141 A1 | * | 1/2007 | Kepler et al. | 252/500 |
| 2008/0079576 A1 | * | 4/2008 | Adapathya et al. | 340/571 |
| 2009/0015202 A1 | * | 1/2009 | Miura | 320/132 |
| 2009/0214941 A1 | * | 8/2009 | Buck et al. | 429/120 |
| 2010/0025132 A1 | * | 2/2010 | Hill et al. | 180/65.29 |

FOREIGN PATENT DOCUMENTS

JP  2004-051791  *  2/2004 ............ C08L 101/00

OTHER PUBLICATIONS

Federal Register, vol. 76, No. 27, pp. 7162-7175, issued Feb. 9, 2011, Supplementary Examination Guidelines for Determining Compliance with 35 U.S.C. 112 and for Treatment of Related Issues in Patent Applications.*
Office Action for U.S. Appl. No. 12/715,630, mailed Jun. 6, 2011, 10 pages.
Office Action for U.S. Appl. No. 12/715,630 (Yebka, "Internally Neutralizing a Power Source," filed Mar. 2, 2010), mailed Apr. 27, 2012, 15 pages.

\* cited by examiner

*Primary Examiner* — Ula C. Ruddock
*Assistant Examiner* — Amanda Barrow
(74) *Attorney, Agent, or Firm* — John L. Rogitz; John M. Rogitz

(57) ABSTRACT

A battery is disclosed that includes two contact areas, an electrolyte, and a conductivity mechanism to increase electron conductivity internal to the battery between the two contact areas that, in turn, deactivates the battery. In one embodiment, the conductivity mechanism is triggered external to the battery. In another embodiment, the conductivity mechanism utilizes deactivator material to increase electron conductivity through the electrolyte to deactivate the battery. In yet another embodiment, the conductivity mechanism creates multiple shorts between the two contact areas to deactivate the battery.

21 Claims, 6 Drawing Sheets

DEACTIVATING A POWER SOURCE

TECHNICAL FIELD

Subject matter disclosed herein relates to deactivating a power source, and more particularly relates to increasing a battery electrolyte's electronic conductivity in order to deactivate the battery.

BACKGROUND

Batteries are used extensively in notebook computers, cell phones, tools, transportation vehicles (e.g., electric cars, trains, buses, etc.), and other systems that depend upon an electrical source to function. Rechargeable batteries, such as lithium-ion batteries, may be the battery of choice due to their relative low cost and high energy storage capability.

A battery uses chemical energy (internal ion transfer) to perform electrical work (external electron transfer). A battery includes two external contact areas (anode and cathode) and an electrolyte. The anode is negatively charged relative to the cathode and, by connecting the anode and cathode to an electronic load, the battery provides power to the electronic load by passing electrons from the anode to the load and back to the cathode. The electrolyte is an ion conductor and an electron insulator. Meaning, the electrolyte passes ions between the anode and cathode, but suppresses electron flow between the anode and cathode. As the battery passes electrons to the electron load (discharges) through its external contacts, the electrolyte passes ions from the anode to the cathode internal to the battery.

SUMMARY

A battery is disclosed that includes two contact areas, an electrolyte, and a conductivity mechanism to increase electron conductivity internal to the battery between the two contact areas that, in turn, deactivates the battery. In one embodiment, the conductivity mechanism is triggered external to the battery. In another embodiment, the conductivity mechanism utilizes deactivator material to increase electron conductivity through the electrolyte to deactivate the battery. In yet another embodiment, the conductivity mechanism creates multiple shorts between the two contact areas to deactivate the battery.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of embodiments of the present disclosure, as defined solely by the claims, will become apparent in the non-limiting detailed description set forth below.

BRIEF DESCRIPTION OF THE DRAWINGS

Features and advantages of the described implementations can be more readily understood by reference to the following description taken in conjunction with the accompanying drawings, wherein.

DETAILED DESCRIPTION

Figure 1A:
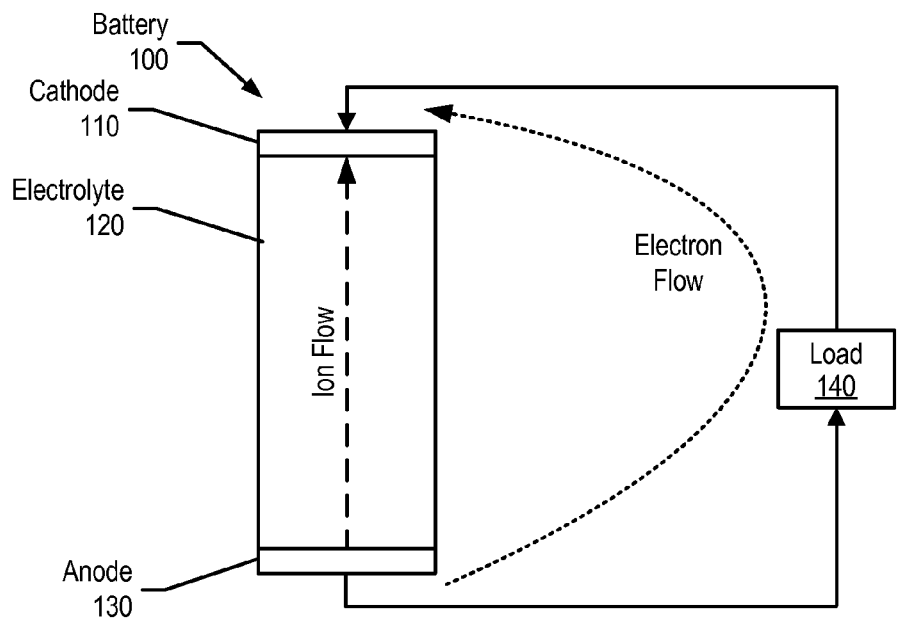
FIG. 1A is a diagram showing a battery generating internal ion flow and providing electron flow to an external load.

Certain specific details are set forth in the following description and figures to provide a thorough understanding of various embodiments of the disclosure. Certain well-known details often associated with computing and software technology are not set forth in the following disclosure, however, to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure. Instead, the following is intended to provide a detailed description of an example of the disclosure and should not be taken to be limiting of the disclosure itself. Rather, any number of variations may fall within the scope of the disclosure, which is defined by the claims that follow the description.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The following detailed description will generally follow the summary of the disclosure, as set forth above, further explaining and expanding the definitions of the various aspects and embodiments of the disclosure as necessary.

FIG. 1A is a general depiction of a battery that can use present principles, and thus shows a battery generating internal ion flow and providing electron flow to an external load. Battery 100 includes two external contact areas, which are cathode 110 and anode 130. For example, cathode 110 may be the "positive" side of battery 100 and anode 130 may be the "negative" side of battery 100. In one embodiment, both cathode 110 and anode 130 have high ionic conductivity and high electronic conductivity.

Battery 100 also includes electrolyte 120, which has high ionic conductivity and little to no electronic conductivity. For example, electrolyte 120 may include electrolytic material such as lithium salts (e.g., $LiPF_6$, $LiBF_4$ or $LiClO_4$) in an organic solvent, such as ethylene carbonate. When load 140 connects to battery 100, electrons flow from anode 130, through load 140, and back to cathode 110. In order for this to occur, ions flow from anode 130 to cathode 110 through electrolyte. In short, battery 100 uses chemical energy (internal ion transfer) to perform electrical work (external electron transfer).

Situations may arise when battery 100 requires deactivation. For example, battery 100 may be on the verge of thermal runaway or a hazardous condition, such as an electric car involved in an accident. In such cases, this disclosure describes embodiments that introduce deactivator material into electrolyte 120 and causes electrolyte 120 to become electronically conductive. When this occurs, the voltage potential between cathode 110 and anode 130 is significantly reduced and battery 100 becomes deactivated.

Figure 1B:
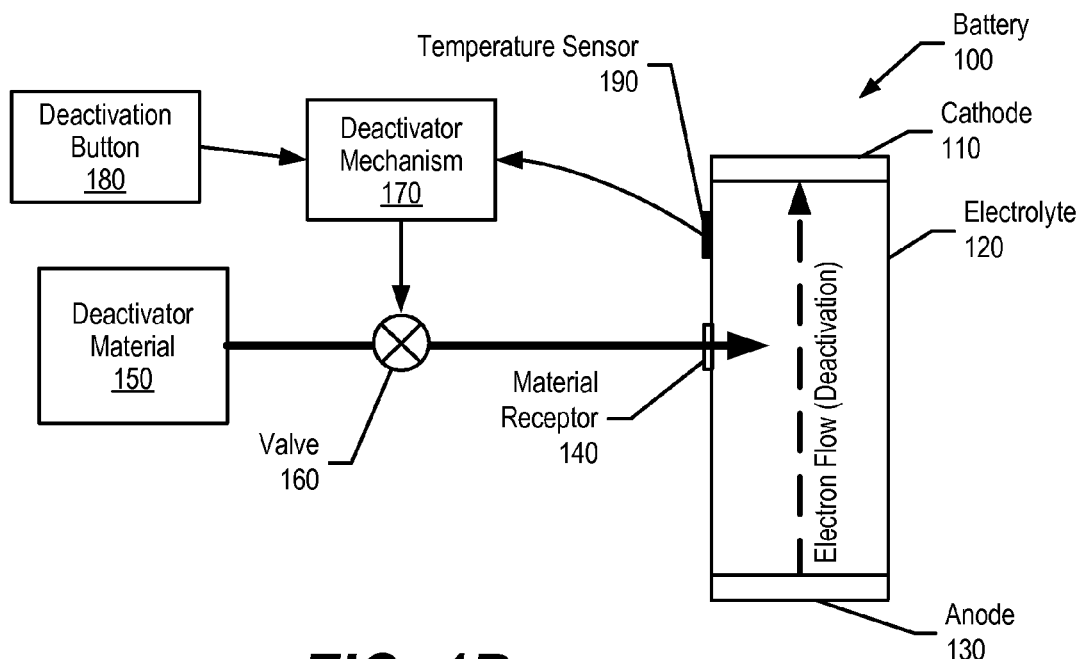
FIG. 1B is a diagram showing a battery receiving deactivation material to deactivate the battery.

FIG. 1B is a diagram showing a battery receiving deactivation material to deactivate the battery. Battery 100 includes material receptor 140, which receives deactivator material 150 and releases deactivator material 150 into electrolyte 120. Deactivator material 150 is a conductivity mechanism that may be electronically conductive or an inert material that creates an electronically conductive combination material when combined with electrolytic material included in electrolyte 120, thereby creating multiple shorts internal to battery 100. In other embodiments, different conductivity mechanisms may be used to create multiple shorts in battery 100 for deactivation, such as having an area on battery 100 for a user to depress that couples metal fragments together.

During cell malfunction or heat exposure, the risk of thermal runaway or explosion is proportional to the voltage potential difference between cathode 110 and anode 130. To minimize or eliminate the risk of thermal runaway or explosion, deactivator material 150 is introduced into electrolyte 120 to increase electron conduction between cathode 110 and anode 130, thereby significantly reducing the voltage potential between cathode 110 and anode 130 (see FIGS. 2-3 and corresponding text for further details).

Deactivator mechanism 170 controls valve 160, which allows deactivator material 150 to reach material receptor 140. The embodiment shown in FIG. 1B shows deactivator mechanism 170 receiving input from deactivation button 180 and temperature sensor 190. Deactivation button 180 may be a button that a user pushes to deactivate battery 100. For example, in an emergency power off (EPO) configuration, deactivation button 180 may be located in proximity to an electric car's battery area. In this example, an emergency respondent may depress deactivation button 180 to inject deactivator material 150 into the car's battery system and disable the car's battery system. In one embodiment, deactivator button 180 and deactivator mechanism 170 are synonymous.

In another embodiment, temperature sensor 190 monitors the temperature of battery 100 to detect thermal runaway conditions. For example, localized heat that is triggered by low electrical resistance contact may lead to battery 100 overheating and thermal runaway. In this embodiment, deactivator mechanism 170 detects battery 100 reaching a "deactivation trip point temperature" (e.g., 130 degrees Celsius) and, in turn, invoking valve 160 to allow deactivator material 150 to release into battery 100. In turn, the voltage potential between cathode 110 and anode 130 is significantly reduced, thereby deactivating battery 100. As those skilled in the art can appreciate, other embodiments may be used to inject deactivator material 150 into electrolyte 120 (see FIGS. 4-5, and corresponding text for further details).

Figure 2:
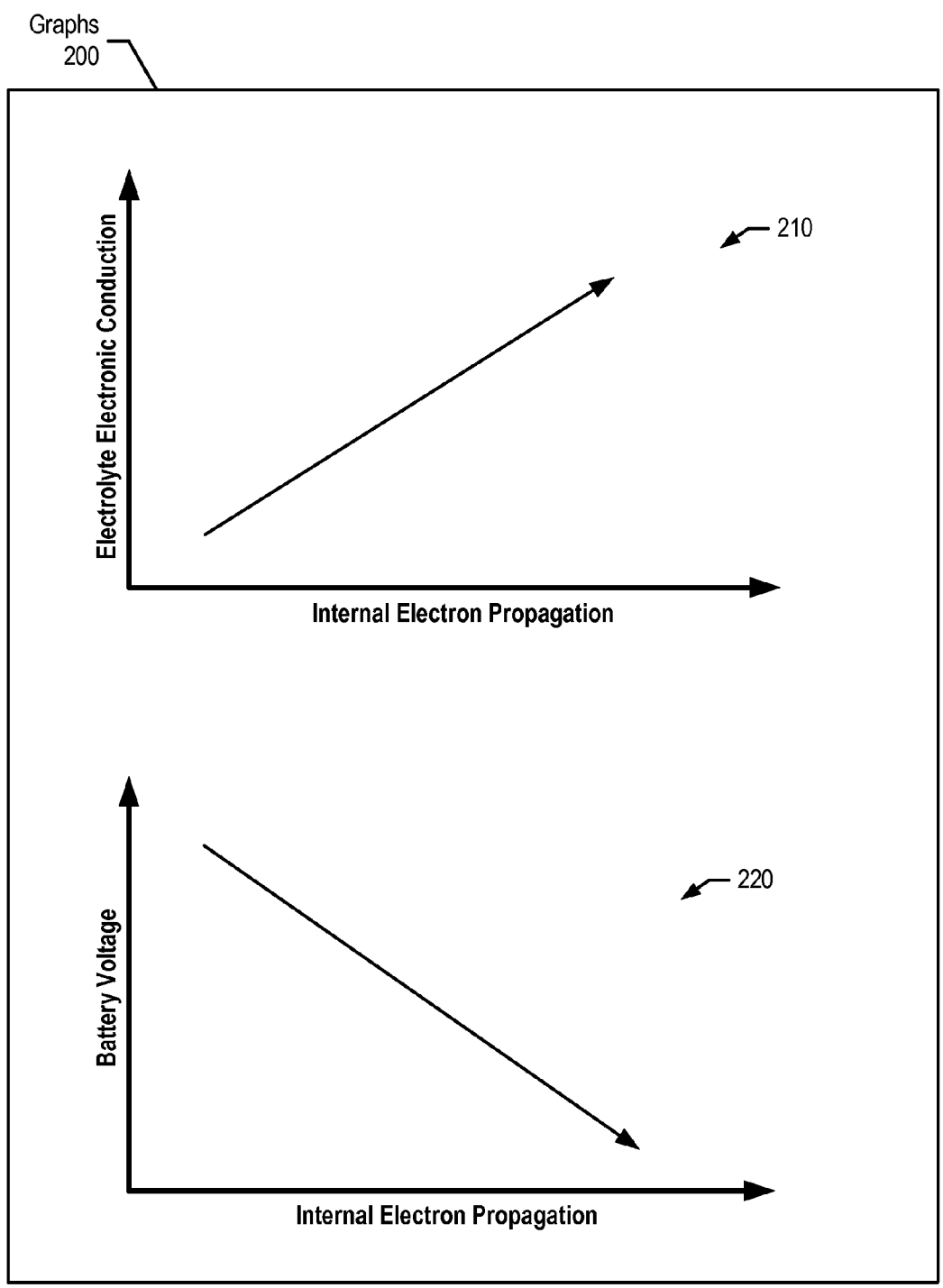
FIG. 2 is a graphical diagram showing relationships between electrolyte electron conduction, internal electron propagation, and battery voltage.

FIG. 2 is a graphical diagram showing relationships between electrolyte electron conduction, internal electron propagation, and battery voltage. Graphs 200 include graph 210 and graph 220. Graph 210 shows that as an electrolyte's electron conductivity increases (y-axis), the internal electron propagation between the anode and cathode increases (x-axis). And, as graph 220 shows, as the internal electron propagation between the anode and cathode increases (x-axis), the battery voltage decreases (y-axis). This is due to the fact that as electrons migrate from the battery's anode to the cathode, the voltage potential difference between the anode and cathode decreases. In short, by increasing the electrolyte's electronic conductivity, the battery's voltage potential decreases and deactivates the battery, therefore minimizing thermal runaway (see FIG. 3 and corresponding text for further details).

Figure 3:
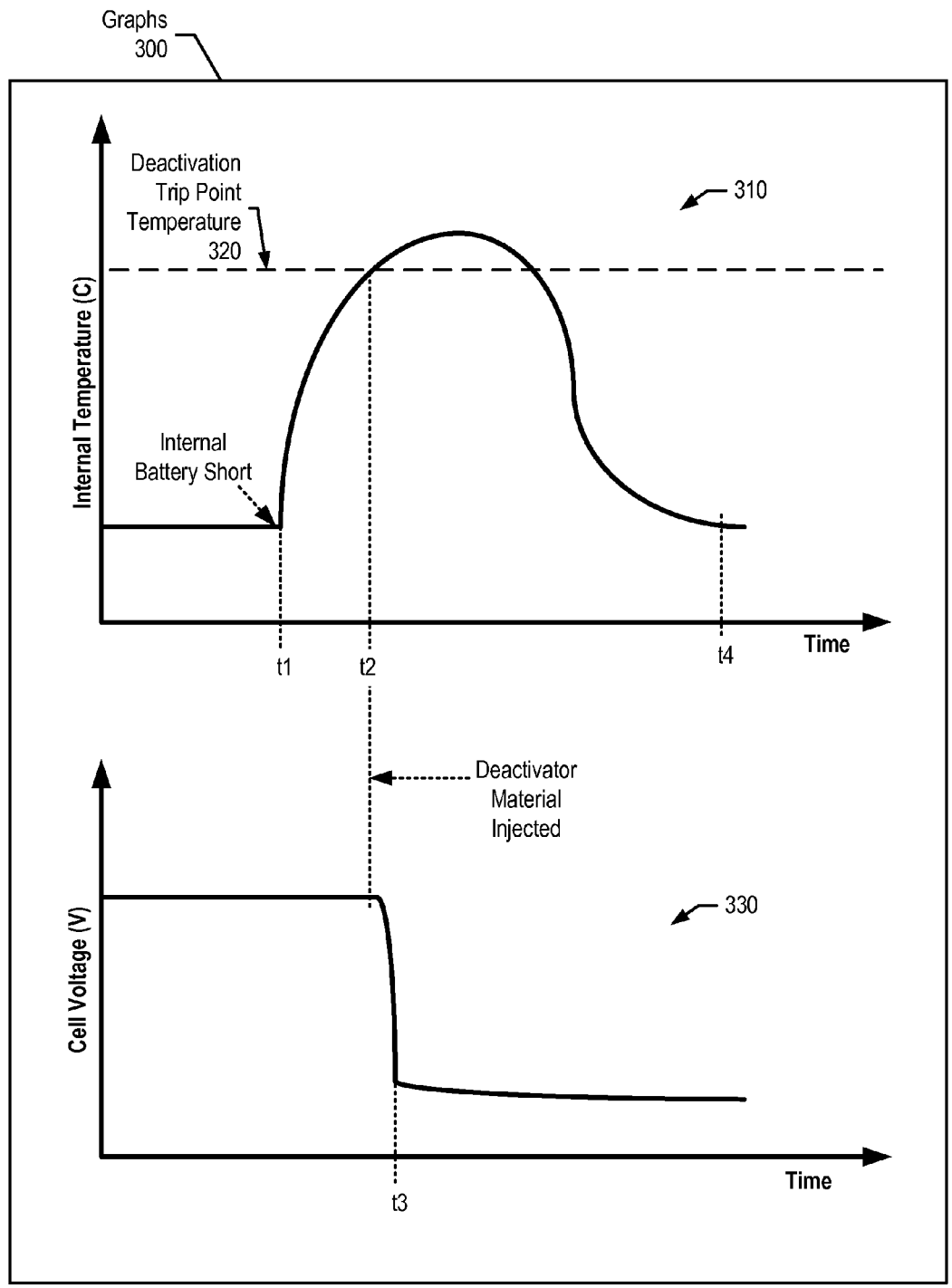
FIG. 3 is a graphical representation of a battery being deactivated after commencing a thermal runaway condition.

FIG. 3 is a graphical representation of a battery being deactivated after commencing a thermal runaway condition. Graphs 300 include graph 310 and graph 330. Graph 310 shows a battery's temperature at various points in time. At time t1, the battery is subject to an internal battery short. For example, the battery may have been damaged, or the battery may include defective material. As discussed previously, a low electrical resistance may trigger a localized heat condition and result in thermal runaway. The internal battery short causes the low electrical resistance and, as graph 310 illustrates, causes the battery's temperature to increase.

The battery's temperature continues to increase, and eventually reaches deactivation trip point temperature 320 at time t2 (e.g., detected by a temperature sensor). At this point, a deactivation mechanism invokes deactivator material into the battery, which causes the battery's electrolyte to become electronically conductive. For example, in the embodiment shown in FIG. 1B, deactivation mechanism 170 receives battery 100's temperature information from temperature sensor 190. Detecting that battery 100's temperature reached deactivation trip point temperature 320, deactivation mechanism 170 invokes valve 160 to release deactivator material 150 into battery 100.

As the battery's electrolyte becomes more conductive and electrons migrate from the battery's anode to cathode, the battery's voltage potential decreases (shown in graph 330). At time t3, the battery is deactivated (little to no voltage potential between the anode and cathode), which causes the battery's temperature to drop and eventually decrease to nominal levels at time t4 (graph 310).

Figure 4A:
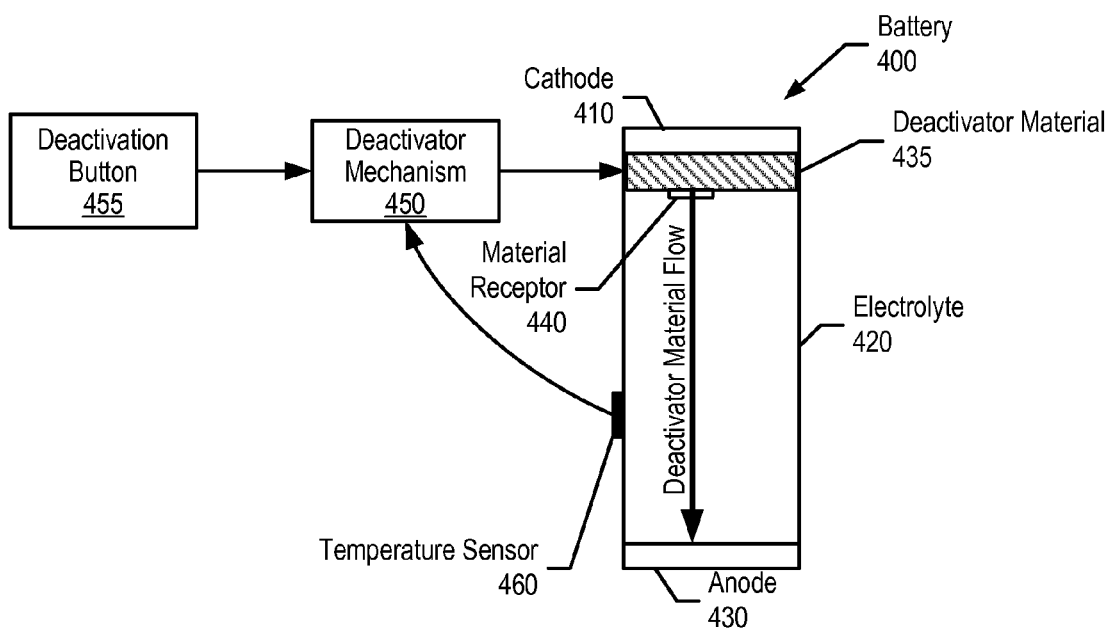
FIG. 4A is a diagram showing a battery that includes internal deactivator material, which is externally invoked by a deactivator mechanism.

FIG. 4A is a diagram showing a battery that includes internal deactivator material, which is externally invoked by a deactivator mechanism. Battery 400 includes cathode 410, electrolyte 420, anode 430, deactivator material 435 and material receptor 440. When deactivator 450 invokes deactivator material 435 to release through material receptor 440, deactivator material 430 enters electrolyte 420, thereby increasing electrolyte 420's electronic conductivity and deactivating battery 400. Deactivator mechanism 450 may receive input from deactivation button 455 or temperature sensor 460 as discussed previously. In one embodiment, deactivator mechanism 450 and deactivation button 455 may be synonymous (see FIG. 4B and corresponding text for further details).

Figure 4B:
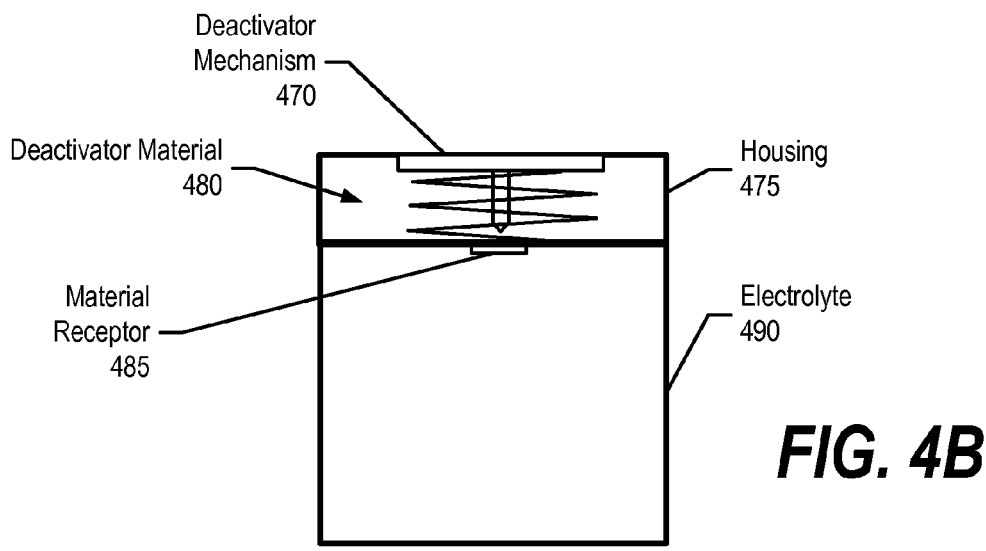
FIG. 4B is a diagram showing an embodiment of a deactivator mechanism invoking deactivator material that is stored internal to a battery.

FIG. 4B is a diagram showing an embodiment of a deactivator mechanism invoking deactivator material that is stored internal to a battery. Deactivator mechanism 470 may be, for example, a spring loaded puncturing device. When a user depresses deactivator mechanism 470, deactivator mechanism 470 punctures through material receptor 485. In turn, deactivator material 480 stored in housing 475 releases through material receptor 485 and into electrolyte 490, thereby increasing electrolyte 490's electronic conductivity as discussed previously. In one embodiment, material receptor 485 may be an area on the wall between housing 475 and electrolyte 490 for deactivator mechanism 470 to puncture.

Figure 5:
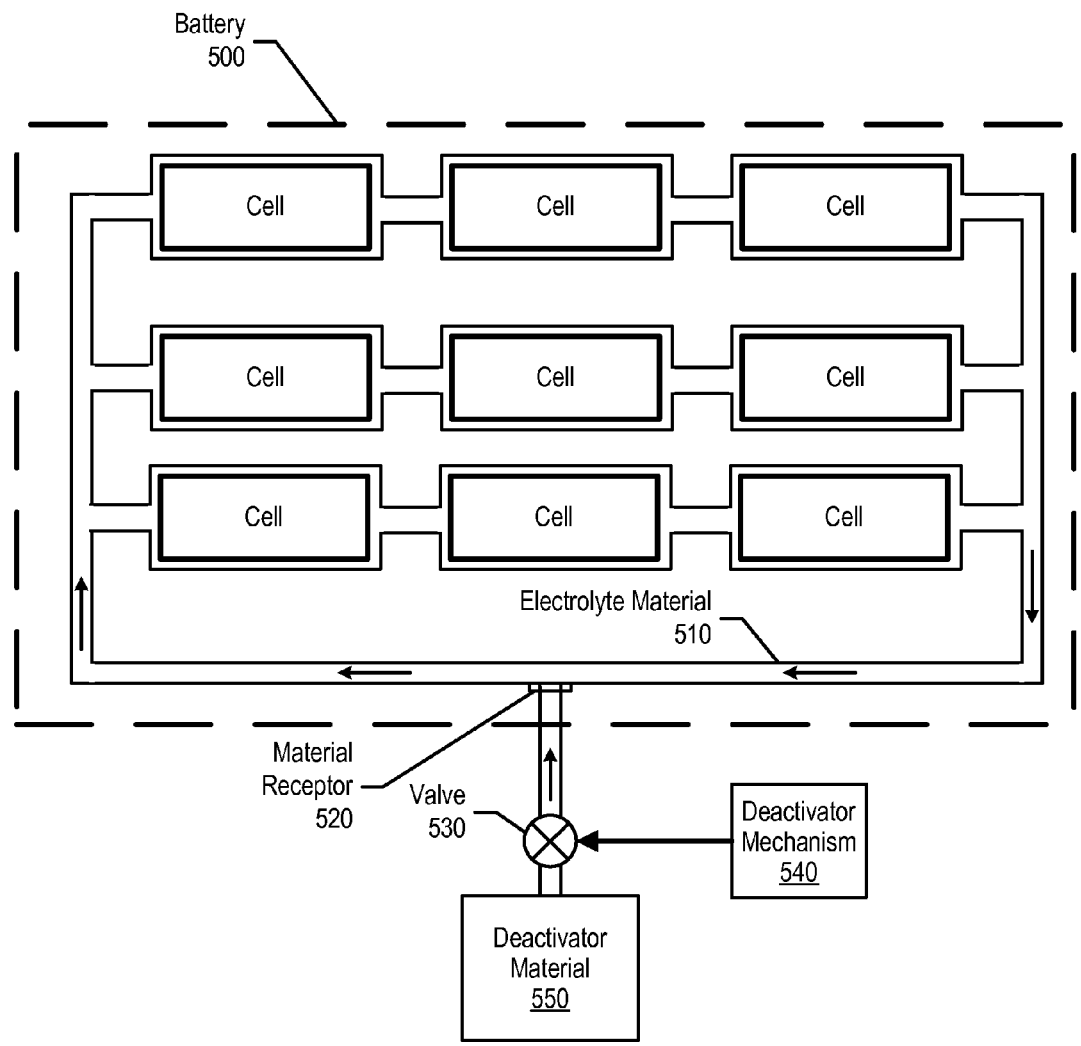
FIG. 5 is a diagram of a multi-cell battery embodiment that includes common electrolyte material.

FIG. 5 is a diagram of a multi-cell battery embodiment that includes common electrolyte material. Battery 500 includes multiple cells (e.g., an automotive battery), electrolyte material 510, and material receptor 520. In one embodiment, some of the cells may be coupled to an external anode contact area and other cells may be coupled to an external cathode contact area. In order to deactivate battery 500, deactivator mechanism 540 invokes valve 530 to allow deactivator material 550 to release through material receptor 520. Deactivator material 550 may be electronically conductive, or deactivator material 550 may combine with electrolyte material 510 to produce an electronically conductive material. In either case, electronic conductivity increases between the cells and deactivates battery 500. In one embodiment, electrolyte material 510 resides within the cells.

Figure 6A:
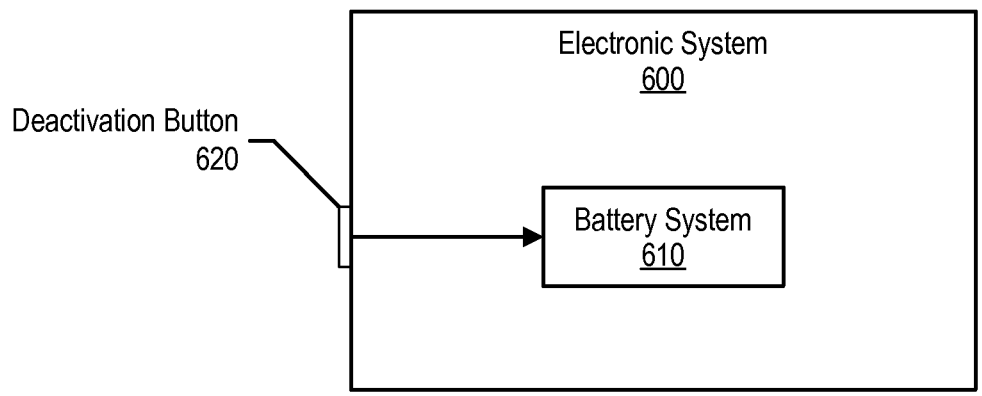
FIG. 6A is a diagram showing an electronic system utilizing a battery system with deactivation capabilities.

FIG. 6A is a diagram showing an electronic system utilizing a battery system with deactivation capabilities as discussed herein. Electronic system 600 may be, for example, a computer system, a cell phone, a medical device, an electronic toy, and etcetera. Battery system 610 includes a battery (anode, cathode, electrolyte, material receptor), deactivator material, deactivation mechanism, and may include a temperature sensor.

Battery system 610 may monitor the battery's temperature and deactivate the battery as discussed herein when the battery's temperature reaches a deactivation trip point temperature. In addition, a user may depress deactivation button 620 to deactivate the battery included in battery system 610. For example, a user may wish to ship a battery to a manufacturer and, in this example, the user may depress deactivation button 620 to deactivate the battery, making the battery safe for shipment.

Figure 6B:
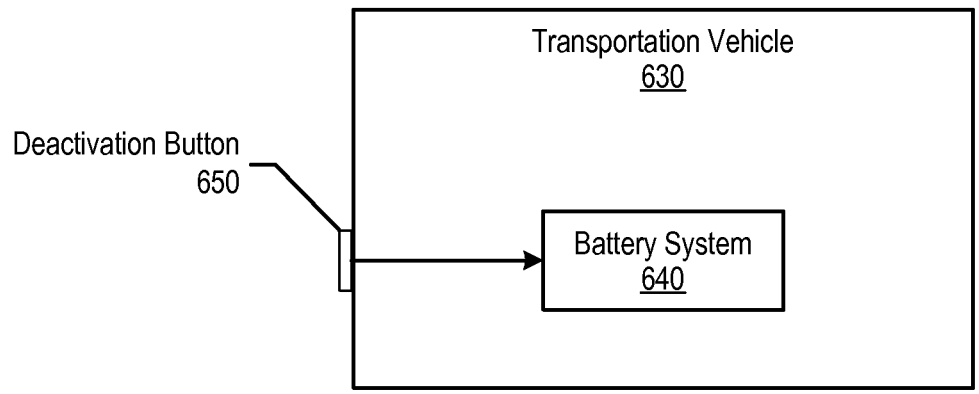
FIG. 6B is a diagram showing a transportation vehicle utilizing a battery system with deactivation capabilities.

FIG. 6B is a diagram showing a transportation vehicle utilizing a battery system with deactivation capabilities as discussed herein. Transportation vehicle 630 may be, for example, an electric car, an electric bus, a commuter rail system with backup power capability, and etcetera. Battery system 640 may include a bank of batteries, deactivator material, deactivation mechanism, and may include temperature sensors.

Battery system 640 may monitor battery temperatures and deactivate the batteries as discussed herein when one of the battery's temperatures reaches a deactivation trip point temperature. In addition, a user may depress deactivation button 650 to deactivate the batteries included in battery system 640 as discussed herein. For example, a person may deactivate an electric car's battery bank when the electric car is involved in an accident. In this example, the person may assist an injured motorist without concern of being shocked.

The block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

What is claimed is:

1. A battery, comprising:
   a first contact area and a second contact area, wherein the first contact area is negatively charged relative to the second contact area;
   an electrolyte that couples to the first contact area and the second contact area, wherein the electrolyte suppresses electron flow internal to the battery between the first contact area and the second contact area and enables ion flow internal to the battery between the first contact area and the second contact area; and
   a conductivity mechanism structured to increase electron conductivity between the first contact area and the second contact area internal to the battery, the conductivity mechanism comprising a deactivator mechanism, a valve operatively coupled to the deactivator mechanism, and a deactivator material reserve arranged for fluid communication with the valve and comprising deactivator material, wherein the deactivator mechanism is arranged to actuate the valve to open the valve for deactivator material to travel from the deactivator material reserve to the electrolyte to introduce deactivator material into the electrolyte to increase electron conductivity between the first contact area and the second contact area.

2. The battery of claim 1, comprising a temperature sensor which monitors temperature of the battery, wherein the deactivator mechanism is arranged to open the valve in response to a signal from the temperature sensor.

3. The battery of claim 2, wherein the temperature sensor is arranged to transmit a signal to the deactivator mechanism to open the valve in response to detecting temperature at a predefined temperature threshold.

4. The battery of claim 1 wherein the deactivator material is electrically conductive.

5. The battery of claim 1 wherein the deactivator material is electrically non-conductive and creates an electrically conductive combination material when the deactivator material is combined with the electrolyte.

6. The battery of claim 1 wherein the battery comprises a plurality of cells and at least one channel fluidly connecting the cells, wherein the electrolyte resides within the plurality of cells and is able to travel between cells through at least one of the at least one channels, and wherein deactivator material is introduced into at least one of the at least one channels to introduce deactivator material into the electrolyte.

7. The battery of claim 1, wherein the conductivity mechanism comprises a material receptor arranged for fluid communication with the valve, wherein the material receptor is arranged to receive deactivator material from the valve and introduce deactivator material into the electrolyte to increase electron conductivity between the first contact area and the second contact area.

8. The battery of claim 1, comprising a button on the battery, wherein the deactivator mechanism is arranged to open the valve in response to a signal from the button.

9. A system comprising:
one or more system components that consume power;
a battery that provides power to the one or more system components, wherein the battery comprises:
a first contact area and a second contact area, wherein the first contact area is negatively charged relative to the second contact area;
an electrolyte that couples to the first contact area and to the second contact area, wherein the electrolyte suppresses electron flow internal to the battery between the first contact area and the second contact area and enables ion flow internal to the battery between the first contact area and the second contact area;
a conductivity mechanism structured to increase electron conductivity between the first contact area and the second contact area internal to the battery, the conductivity mechanism comprising a deactivator mechanism, a valve operatively coupled to the deactivator mechanism, and a deactivator material reserve arranged for fluid communication with the valve and comprising deactivator material, wherein the deactivator mechanism is arranged to actuate the valve to open the valve for deactivator material to travel from the deactivator material reserve to the electrolyte to introduce deactivator material into the electrolyte to increase electron conductivity between the first contact area and the second contact area.

10. The system of claim 9, comprising a temperature sensor which monitors temperature of the battery, wherein the deactivator mechanism is arranged to open the valve in response to a signal from the temperature sensor.

11. The system of claim 10, wherein the temperature sensor is arranged to transmit a signal to the deactivator mechanism to open the valve in response to detecting temperature at a predefined temperature threshold.

12. The system of claim 9 wherein the deactivator material is electrically conductive.

13. The system of claim 9 wherein the deactivator material is electrically non-conductive and creates an electrically conductive combination material when the deactivator material is combined with the electrolyte.

14. The system of claim 9, wherein the conductivity mechanism comprises a material receptor arranged for fluid communication with the valve, wherein the material receptor is arranged to receive deactivator material from the valve and introduce deactivator material into the electrolyte to increase electron conductivity between the first contact area and the second contact area.

15. The system of claim 9, wherein the system is an information handling system, wherein the information handling system comprises a button on the exterior of the information handling system, and wherein the deactivator mechanism is arranged to open the valve in response to a signal from the button.

16. The system of claim 9, wherein the system is a vehicle, wherein the vehicle comprises a button on the vehicle at a location on the vehicle other than the battery, and wherein the deactivator mechanism is arranged to open the valve in response to a signal from the button.

17. A method for producing a battery, the method comprising:
including a first contact area and a second contact area in the battery, wherein the first contact area is negatively charged relative to the second contact area;
including an electrolyte in the battery that couples to the first contact area and to the second contact area, wherein the electrolyte suppresses electron flow internal to the battery between the first contact area and the second contact area and enables ion flow internal to the battery between the first contact area and the second contact area; and
including a conductivity mechanism in the battery structured to increase electron conductivity between the first contact area and the second contact area internal to the battery, the conductivity mechanism comprising a deactivator mechanism, a valve operatively coupled to the deactivator mechanism, and a deactivator material reserve arranged for fluid communication with the valve and comprising deactivator material, wherein the deactivator mechanism is arranged to actuate the valve to open the valve for deactivator material to travel from the deactivator material reserve to the electrolyte to introduce deactivator material into the electrolyte to increase electron conductivity between the first contact area and the second contact area.

18. The method of claim 17 further comprising:
including a material receptor in the conductivity mechanism that is arranged for fluid communication with the valve, wherein the material receptor is arranged to receive deactivator material from the valve and introduce deactivator material into the electrolyte to increase electron conductivity between the first contact area and the second contact area.

19. The method of claim 17 further comprising steps of:
including a temperature sensor on the battery which monitors temperature of the battery, wherein the deactivator mechanism is arranged to open the valve in response to a signal from the temperature sensor, and wherein the temperature sensor is arranged to transmit a signal to the deactivator mechanism to open the valve in response to detecting temperature at a predefined temperature threshold.

20. The method of claim 17 wherein the deactivator material is electrically conductive.

21. The method of claim 17 wherein the deactivator material is electrically non-conductive and creates an electrically conductive combination material when the deactivator material is combined with the electrolyte.

* * * * *